United States Patent

Iwamura

(10) Patent No.: US 7,206,320 B2
(45) Date of Patent: Apr. 17, 2007

(54) METHOD AND APPARATUS FOR NON-CENTRALIZED NETWORK BANDWIDTH MANAGEMENT

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 220 days.

(21) Appl. No.: 10/738,056

(22) Filed: Dec. 16, 2003

(65) Prior Publication Data

US 2004/0261101 A1    Dec. 23, 2004

Related U.S. Application Data

(60) Provisional application No. 60/479,406, filed on Jun. 18, 2003.

(51) Int. Cl.
H04L 12/413    (2006.01)
H04L 12/43    (2006.01)

(52) U.S. Cl. ................. 370/448; 370/445; 370/447; 370/458; 370/459

(58) Field of Classification Search ............... 370/437, 370/445, 447, 448, 458–462, 485–490; 340/310.11, 340/310.12
See application file for complete search history.

(56) References Cited

U.S. PATENT DOCUMENTS

| | | | | |
|---|---|---|---|---|
| 5,491,463 A | | 2/1996 | Sargeant et al. | |
| 5,544,161 A | * | 8/1996 | Bigham et al. | 370/397 |
| 5,553,072 A | * | 9/1996 | Daggett et al. | 370/447 |
| 5,960,001 A | * | 9/1999 | Shaffer et al. | 370/448 |
| 6,014,087 A | * | 1/2000 | Krishnakumar et al. | 340/825.5 |
| 6,522,650 B1 | * | 2/2003 | Yonge et al. | 370/390 |
| 6,577,630 B1 | * | 6/2003 | Markwalter et al. | 370/392 |
| 6,760,308 B1 | * | 7/2004 | Ghanma et al. | 370/235 |
| 6,877,043 B2 | * | 4/2005 | Mallory et al. | 709/251 |
| 2002/0181613 A1 | | 12/2002 | Kim et al. | |
| 2003/0002572 A1 | | 1/2003 | Hoobler | |
| 2003/0006881 A1 | | 1/2003 | Reyes | |
| 2003/0006884 A1 | | 1/2003 | Kim et al. | |
| 2003/0038710 A1 | | 2/2003 | Manis et al. | |
| 2003/0095036 A1 | | 5/2003 | Wasaki et al. | |

* cited by examiner

Primary Examiner—Seema S. Rao
Assistant Examiner—Mark A. Mais
(74) Attorney, Agent, or Firm—John P. O'Banion

(57) ABSTRACT

A system and method of providing distributed video and/or audio communication over a network, such as a power-line communications (PLC) network. By way of example, the network is divided into periodic cycles wherein each cycle comprises a number of time slots. The timing of the cycles is determined by a cycle master that assumes the position when it desires to send a transmission and is unable to detect valid cycles on the network. A portion of each cycle is reserved for the transmission of asynchronous data, the remainder being utilized for isochronous streams. Before transmitting a new stream a transmitter wins one or more open slots by arbitration, wherein the winner is selected based on the priority of the stream to be sent. Transmitters may obtain extra slots to improve quality, integrity, or security of the stream. The mechanisms of the invention are compatible with legacy CDMA devices.

29 Claims, 10 Drawing Sheets

METHOD AND APPARATUS FOR NON-CENTRALIZED NETWORK BANDWIDTH MANAGEMENT

CROSS-REFERENCE TO RELATED APPLICATIONS

This application claims priority from U.S. provisional application Ser. No. 60/479,406 filed on Jun. 18, 2003, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to network communication systems, and more particularly to methods of prioritized data transmission.

2. Description of Related Art

There are two broad categories of networks: isochronous networks and non-isochronous networks. An IEEE 1394 network is a typical isochronous network in which one of the devices on the network manages time slot use. In response to requests from other devices wanting to send a stream, available time slots are allocated by a time slot manager. Once assigned, a transmitter can generally continue to use a time slot, uninterrupted by other streams, until the transmission ends. The original stream packet intervals transmitted over the network are reconstructed on the receiver side. A substantial advantage of isochronous communication is that QoS (quality of service) is completely guaranteed.

However, isochronous networks also harbor some disadvantages. For example, within a centralized network if the time slot manager is disconnected, another device has to take over the time slot management, consequently requiring that each network-centric device be configured with time slot management capability which increases network device cost. Furthermore, in response to device connection or disconnection, a full bus reset occurs that disturbs bus communications. This type of isochronous control operates satisfactorily on a dedicated noise-free network such as IEEE 1394, but it is not well suited for use on networks subject to harsh transmission conditions such as an 802.11 wireless network or a power-line network.

A typical non-isochronous network is represented by Ethernet over which traffic is often controlled using a CSMA/CA (Carrier Sense Multiple Access/Collision Avoidance) mechanism, or similar. Under CSMA/CA, when a device on the bus wants to communicate with another device, the transmitter first detects a carrier on the bus. If no carrier is detected, then the device commences communication. If, however, carrier is detected then the transmitter enters a back-off mode, and after a delay reattempts the process. The wait time during backoff is generally randomized so that two waiting devices do not collide again. In conventional CSMA/CA the bus is not controlled by a time slot manager.

Utilizing a non-isochronous network provides both advantages and disadvantages. One advantage is with regard to allowing users to freely connect or disconnect devices onto, or off of, the network without the penalty of a bus reset. Each device need not be concerned with the network status, in particular what devices are connected, or are not connected to the network. The network interface is simple and low-cost because no time slot management capability is required. A disadvantage is that quality of service (QoS) is not guaranteed; when the network is busy devices are subject to indeterminate wait intervals.

A number of market forces are driving advances in networking. One such force is the expanding home networking market, which has been adopting 802.11 wireless standards and the HomePlug™ 1.0 power line network standards. Both of these standards are Ethernet-equivalent and do not guarantee quality of server (QoS). Although network standards such as IEEE 1394 guarantee QoS, they are not well suited to a number of markets due to a limited cable transmission range and because cables must be routed from device to device, such as between rooms in a household.

Accordingly, a need exists for autonomous network communication standards which provide flexibility and low cost, while being capable of supporting a given quality of service (QoS) for at least a portion of the transmissions communicated over the network. The present invention is an autonomous network that satisfies those needs, as well as others, and overcomes the deficiencies of previously developed network solutions.

BRIEF SUMMARY OF THE INVENTION

A method and system of autonomous, non-centralized, network control is described that provides guaranteed quality of service. The inventive system and method is well suited for use in a power-line communications (PLC) network.

Allocation of time slots to support different stream transmissions is determined autonomously on the network wherein a time slot manager, or arbitrator, is not required. The first device on the network seeking to transmit a stream assumes the role of cycle master to clock the cycles for the network, while all transmitter devices on the network independently enter arbitration for obtaining a desired number of time slots. Each transmission cycle is preferably divided into portions for isochronous transmission and asynchronous transmissions. The internal clock differences between devices on the network do not accumulate, and the cycle master may be disconnected without disrupting stream traffic.

A number of beneficial modes and aspects are taught within the present invention, which are grouped into the following categories:

(1) Reserving priority channel bandwidth within the present invention by filling them with dummy transmissions. The cycle master fills unused time slots within the isochronous portion of the transmission cycle with dummy transmissions, thereby preventing lower priority asynchronous devices from improperly utilizing the reserved bandwidth. Filling the unused time slots within the reserved bandwidth allows utilization of legacy devices on the PLC network which can communicate during the asynchronous portion of the transmission cycle. Legacy devices may be considered as asynchronous devices which are not configured for being controlled by an adaptive bandwidth manager.

(2) Subdividing priority within a given priority level. Streams are passed sequential tokens when requesting time slots based on the number of active streams, the value of the token (subpriority value) determines the order in which streams may obtain time slots within arbitration at a given priority until the stream terminates. By way of example, a numerical token is passed (i.e. from the set {0, 1, 2 . . . n}) wherein lower subpriority numbers get precedence in obtaining time slots. As stream terminations occur the priority shifts based on token value, with the remaining streams filling sequential high subpriority values. The tokens are preferably shared between servers on the virtual network.

(3) Automatically enhancing stream signals. Signal enhancement is performed within the present invention in response to the availability of bandwidth for a given priority level. Unused portions of reserved bandwidth, for example as allocated to a given stream priority such as that portion associated with isochronous streams, is automatically utilized according to this aspect of the invention, for improving the quality, integrity or security of the stream. So instead of merely filling the unused bandwidth portions (i.e. time slots) with dummy data the stream is encoded at higher quality, with more assurance from data loss, with greater security, or a combination of stream improvements.

(4) Automatically reducing bandwidth in response to conditions. The amount of bandwidth utilized for each stream can be automatically reduced in the system in response to bandwidth degradation, or the need to transmit additional streams when the available bandwidth has been utilized. All streams, or selected streams, are commanded (if capable) to reduce their bandwidth utilization. Bandwidth restrictions can also be loosened as streams terminate thereby lessening the requested bandwidth.

The present invention provides numerous advantages over current systems and mechanisms, example include the following.

An aspect of the invention is to reserve proper bandwidth allocations for streams while effectively utilizing overall bandwidth.

Another aspect of the invention is to reserve priority channel bandwidths and prevent reserved bandwidth from being lost to low-priority asynchronous communications.

Another aspect of the invention is to provide autonomous network control in a non-centralized manner that does not require a time slot manager or an arbitrator.

Another aspect of the invention is to provide graceful transitions after a new connection or a disconnection, wherein a full bus reset is not required, and the existing communications need not be disturbed.

Another aspect of the invention is to provide network communications in which QoS is guaranteed and important audio/video streams need not be interrupted when devices are added or removed from the network.

Another aspect of the invention is to provide a flexible and extendable mechanism for sharing network bandwidth amongst isochronous streams and non-isochronous streams, and which can be implemented simply and inexpensively.

Another aspect of the invention is to provide for audio/video stream transmissions over time slots wherein consecutive time slots can be obtained for supporting a high rate stream.

Another aspect of the invention is to provide for audio/video stream transmissions wherein internal clock differences between transmission devices on the network do not accumulate.

Another aspect of the invention is to provide for audio/video stream transmissions incorporating a predetermined or selectable interval within each cycle for carrying asynchronous transmissions, thereby assuring fast asynchronous transmissions.

Another aspect of the invention is to provide for audio/video stream transmissions wherein both a stream transmitter and a stream receiver check a time slot before stream transmission commences, thereby avoid possible time slot use conflicts.

Another aspect of the invention is to provide for audio/video stream transmissions wherein a first transmitter and receiver pair can utilize one or more time slots, in use by a second transmitter and receiver pair, if sufficient attenuation exists between the first and second pair for establishing low error rate communications.

Another aspect of the invention is to provide for audio/video stream transmissions wherein the time slot allocation process is compatible with legacy CDMA/CA (carrier sense multiple access/collision avoidance) devices.

Another aspect of the invention is to provide for audio/video stream transmissions wherein time slots are obtained by autonomous arbitration and no dedicated arbitrator is necessary.

Another aspect of the invention is to provide for audio/video stream transmissions wherein time slots are assigned in a flexible manner and the reassignment request mechanism allows existing devices to fully utilize the bandwidth.

Another aspect of the invention is to generate dummy data for filling unused time slots within a reserved bandwidth sections (time or frequency domain) to prevent time slot loss.

Another aspect of the invention is to allow prioritized utilization of bandwidth while maintaining backward compatibility with non-prioritized asynchronous devices.

Another aspect of the invention allows for subdividing transmission priority levels so that transmission priority is fairly shared among streams.

Another aspect of the invention is the use of sequentially lower subpriority values for each active stream wherein time slots are more equitably obtained across servers, or virtual networks within a physical network.

Another aspect of the invention is increasing effective utilization of bandwidth by automatically enhancing quality, integrity or security of a stream when spare bandwidth is available.

A still further aspect of the invention provides for automated bandwidth reductions for a stream when conditions deteriorate or the number of transmission requests increases.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 21. It will be appreciated that the apparatus may vary as to configuration and as to details of the parts, and that the method may vary as to the specific steps and sequence, without departing from the basic concepts as disclosed herein.

1. Power Line Network.

The bandwidth allocation and reservation techniques described herein may be utilized in a number of different types of networks, and are very well suited for use on power-line communication (PLC) networks. By way of example, the teachings herein describe the invention in terms of use on a power-line communications network. However, all or portions of the teachings are applicable to other network forms, such as wireless networks and other networks.

1.1 Network Configuration.

Figure 1:
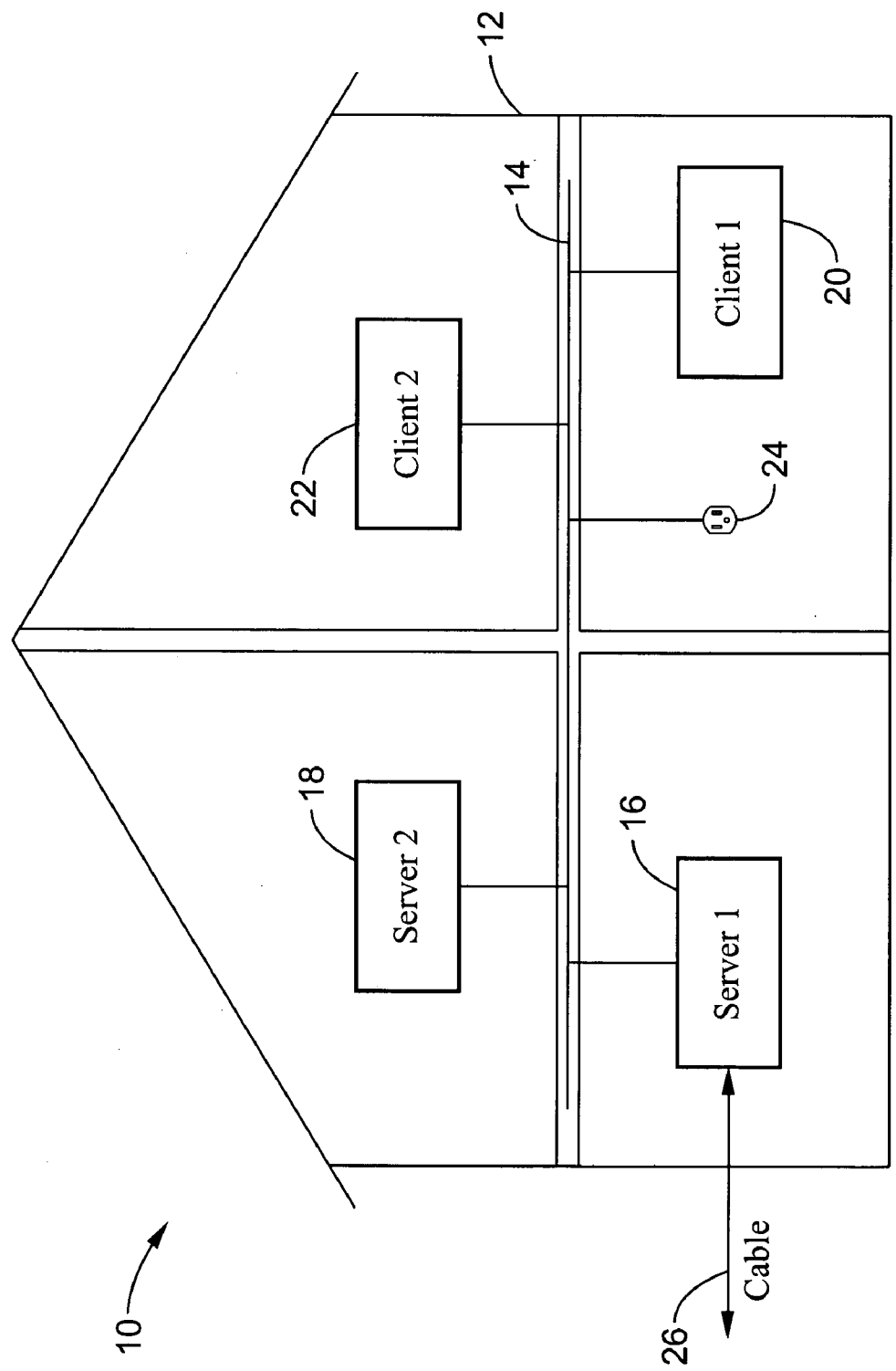
FIG. 1 is a block diagram of a residential power-line communications network shown with servers and clients distributed over a virtual PLC network.

FIG. 1 illustrates an example 10 of a distributed system operating over a residential PLC network. A residential dwelling 12 is shown having an AC power line 14 which interconnects a number of rooms. A distributed system comprising server-1 16, server-2 18, client-1 20 and client-2 22 are connected to the power line, typically by way of AC outlets with an unused outlet 24 being shown by way of example. For the sake of clarity, the external connection of AC power line 14 to a distribution transformer or the like is not shown.

A cable 26 is shown connecting to server-1 16 to provide access to various content, such as cable programming, internet connectivity, and so forth. It will be appreciated that other forms of connectivity, including both wired forms and wireless forms may be received by the system.

Server-1 16 in this example is configured for storing audio/video data and is capable of sending streams to one or more clients on the PLC network. An audio/video content stream from cable 26, as received by server-1 16, can be transmitted to clients, such as client-1 20 or client-2 22, as well as to other servers. Server-1 16 and server-2 18 in this example operate with similar functionality. As utilized herein the term "stream" refers to both isochronous and asynchronous communication streams.

1.2 Server.

Figure 2:
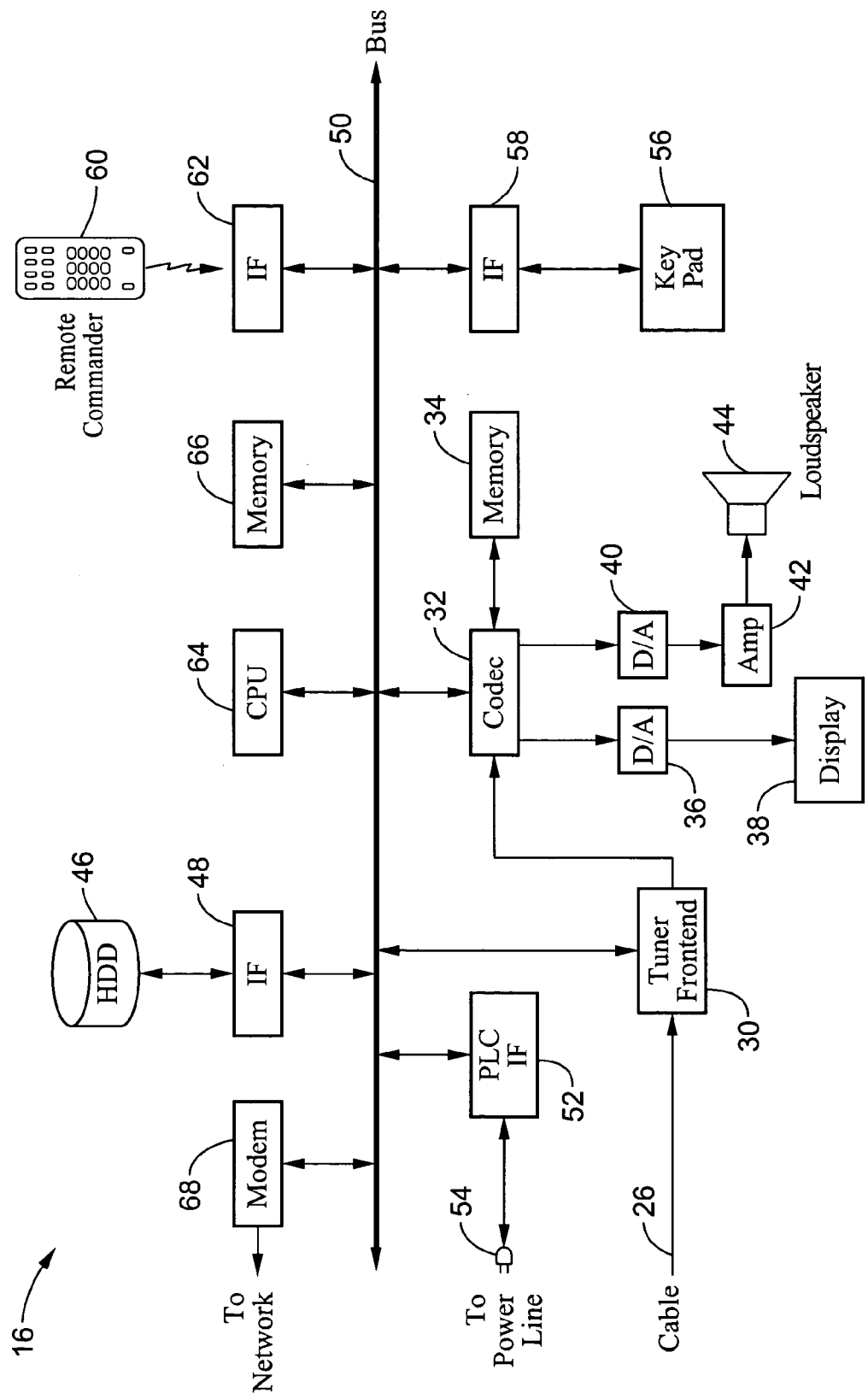
FIG. 2 is a block diagram of a PLC-ready server according to an aspect of the present invention, shown having a PLC interface, content storage, display, user-interface, and remote control interface.

FIG. 2 illustrates an example embodiment of server-1 16. Tuner front-end 30 receives an RF signal from cable network 26, which is decoded by codec block 32 which decodes the demodulated signal from tuner front-end 30 in combination with memory 34. Decoded video signals are converted to analog, such as by D/A converter 36 and displayed on display 38. Decoded audio signals are converted to analog in D/A Converter 40, amplified in amplifier 42 and sent to audio transducer (i.e. speaker assembly) 44. To record a video stream, codec 32 sends the stream to a data storage subsystem, such as hard disk drive 46 (HDD) which is preferably accessed through interface 48 connected to bus 50. In replaying a recorded stream, codec 32 receives the stream from HDD 46 and decodes it.

Consider the case of server-1 16 sending a video stream to client-1 20 over power line 14. The stream from tuner front-end 30 is sent through codec 32 to a PLC interface 52 and through AC connection 54 to the PLC network to receipt by client-1 20. Similarly, to play a recorded stream, a stream from HDD 46 is sent to PLC interface 52 for receipt by client-1 20 over the PLC network.

PLC interface 52 preferably includes encryption and decryption mechanisms. It is generally preferred that all communication be encrypted before sending over the PLC network, and decrypted upon receipt.

The user may control operations by using keypad 56, connected to bus 50 by keypad interface 58, or a remote control unit 60 connected to bus 50 by a remote interface 62. Commands are received by way of bus 50 for CPU 64, which executes instructions within memory 66. A modem 68 provides a network connection for the server, and is shown by way of example bridging an external network connection (i.e. telephone, DSL, cable, LAN, WAN, etc.) to bus 50 which is accessible to the circuit elements within server 16.

Figure 3:
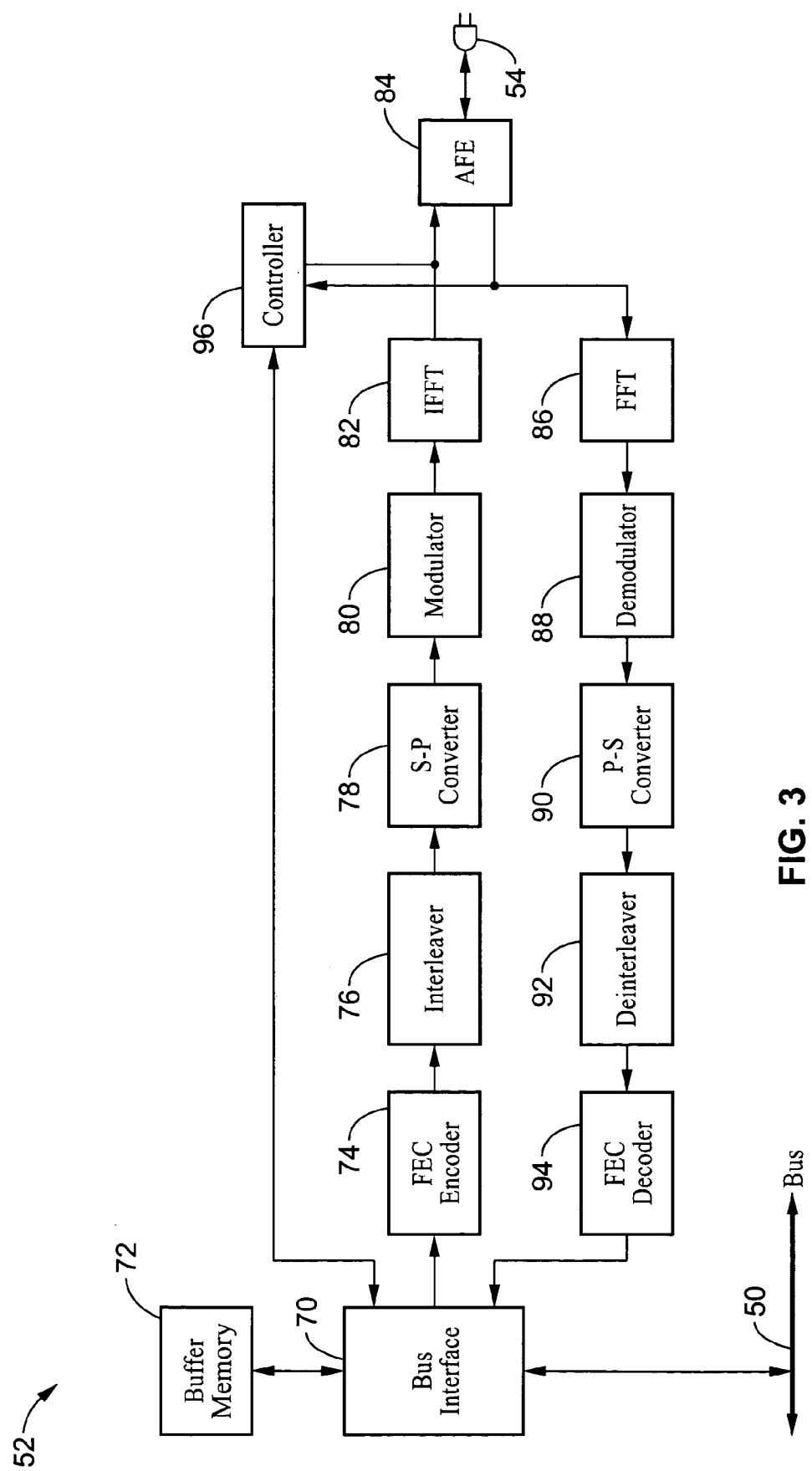
FIG. 3 is a block diagram of a PLC interface according to an aspect of the present invention, showing encrypted communication from a server bus to the PLC network.

FIG. 3 illustrates a block diagram of PLC interface 52. In the example shown, orthogonal frequency division multiplexing (OFDM) technology is used for signal transmission over the power line. Data to be transmitted is received from bus 50 by bus interface 70 and may be stored in buffer memory 72 if necessary. Error correction code is added to the data in forward error correction encoder (FECE) 74, the result from which is interleaved by interleaver 76 and converted to parallel data by serial-parallel converter 78, prior to being modulated by modulator 80 and sent to inverted fast-Fourier transform (IFFT) block 82. In IFFT 82, a carrier is assigned to each input signal and the signals are inversely fast-Fourier-transformed.

The resultant signals from processing blocks 74–82 are then sent to analog front-end (AFE) 84 and sent to PLC 14 through power plug 54.

The blocks represented in the lower half of FIG. 3 illustrate data reception. AFE 84 receives a stream from the client through AC connector 54 which is coupled to PLC 14 (FIG. 1). The received data is fast-Fourier-transformed by FFT 86, demodulated by demodulator 88 and parallel-serial converted by P-S converter 90. The resultant signal is de-interleaved by de-interleaver 92, error corrected by FEC decoder 94 and sent to bus interface 70.

Controller 96 controls the operations of blocks depicted in the figure, monitors the network, and generates signaling, such as transmitting the cycle start signal and arbitration request signal.

1.3 Client.

Figure 4:
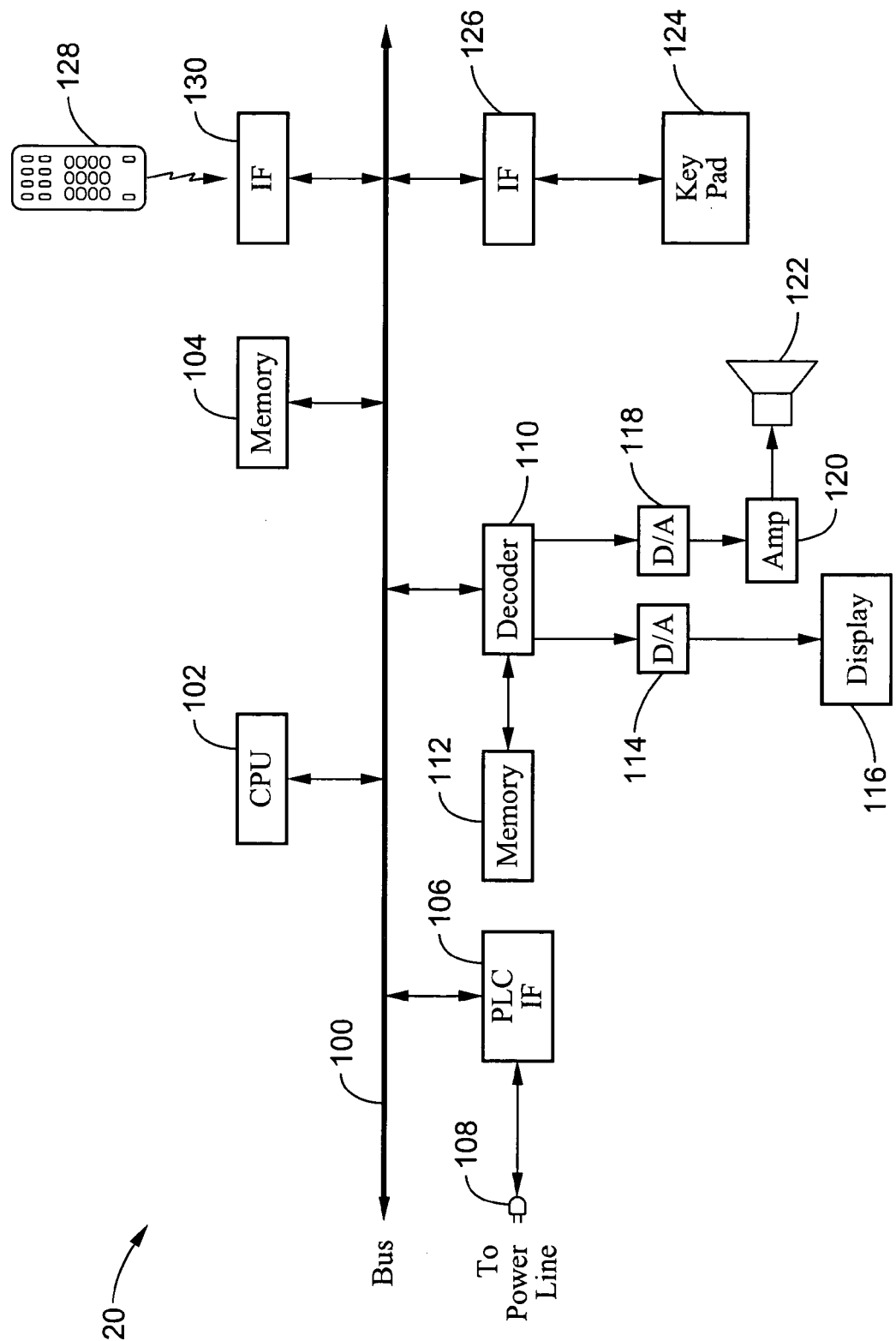
FIG. 4 is a block diagram of a client device according to an aspect of the present invention, showing a client television configured for connection on a PLC network.

FIG. 4 illustrates an example embodiment of a client, such as client-1 20. A local bus 100 interconnects the circuitry of client 20 under the control of CPU 102 in combination with memory 104. Power-line communications (PLC) network interface (IF) 106 receives the stream from another device through power connector 108, such as server-1 16 (FIG. 1), or server-2 18 which is sent to decoder 110 in combination with local bus 100.

It should be appreciated that PLC interface 106 may be embodied in the same manner as shown in FIG. 3, or implemented using any convenient alternative circuit design. Decoder 110 operates in combination with memory 112 to decode the stream. The decoded video signal is converted to the correct format, such as from digital to analog formats by D/A converter 114 and displayed on display device 116. Audio signals generated from decoder 110 are converted for audio output, such as to analog signals by D/A converter 118 and amplified by amplifier 120 before being output on audio transducer 122.

PLC communications are preferably encrypted before sending to the power line and decrypted after receiving from the power line. Commands for client 20 may be entered using keypad 124 in combination with keypad interface 126, or by utilizing a remote control unit 128 in combination with remote interface 130 wherein the commands are received by CPU 102 over local bus 100.

2. Autonomous Network Control.

Time slot managers are required for implementing an IEEE 1394 network, however, the present network communication aspects do not require utilizing such a manager, because each device on the network preferably has the same capabilities, except those devices considered "legacy" devices.

The autonomous network is controlled by (a) generating cycle start signals over the network when cycle start signals are not detected, such as by a first device wanting to transmit a stream; (b) arbitrating for time slots, performed independently by each transmitter, to obtain sufficient time slots for transmitting a stream to a destination; and (c) transmitting a stream using the obtained time slots.

Time slots are obtained in an arbitration process. To obtain a time slot a device monitors the network and sends a request to get an available time slot. Upon obtaining a time slot it commences transmission. It is irrelevant to device operation which device is sending what data to whom, the device only detects if each time slot is occupied or not. As a result of non-centralized network control, any of the devices can be disconnected without the need to perform a full reset, thereby allowing the user to freely connect or disconnect devices in a similar manner to an Ethernet device.

2.1 Generation of Cycle Start Signal.

Figure 5:
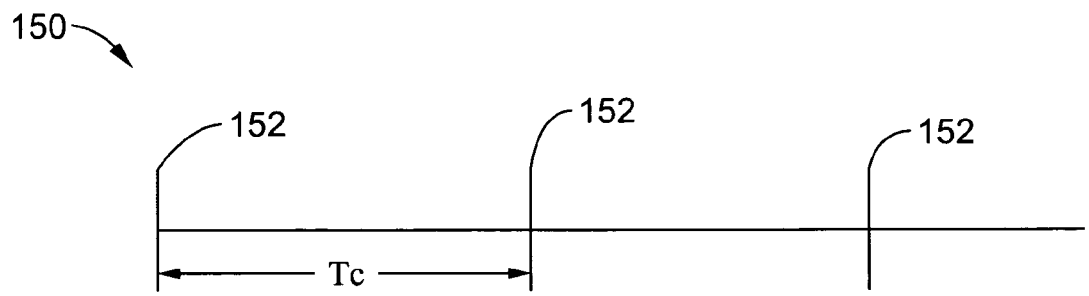
FIG. 5 is a timing diagram for network transmissions according to an aspect of the present invention, showing the generation of cycle start signals by one of the transmitter devices which assumes the role of cycle master.

FIG. 5 illustrates network transmissions 150 in the case in which server-1 16 begins transmitting an isochronous stream to client 20. First, server-1 16 monitors PLC network transmissions 150 for communications. If no communication is detected, server-1 16 becomes the cycle start master and starts sending cycle start signals 152 periodically (period=$T_c$).

If a signal collision or another signal is detected, server-1 16 immediately stops the cycle start signal and after some back-off time, it will reattempt the cycle. During back-off the transmitter monitors for cycle start signals and only reattempts generation if none are detected. The back-off time is preferably a random time value within a predetermined range of time values. If another device is already transmitting cycle start signals, server 16 will not generate cycle start signals, as only one device on the network is allowed to be the cycle start master.

It should be appreciated that within this approach the accesses to the power-line communication (PLC) network are repeated with a cycle time of $T_c$. Framed within cycle times, each time slot has a fixed time length. In certain applications it makes sense to synchronize this cycle timing with the 60 Hz cycling of the power line.

2.2 Transmission of a First Stream.

Figure 6:
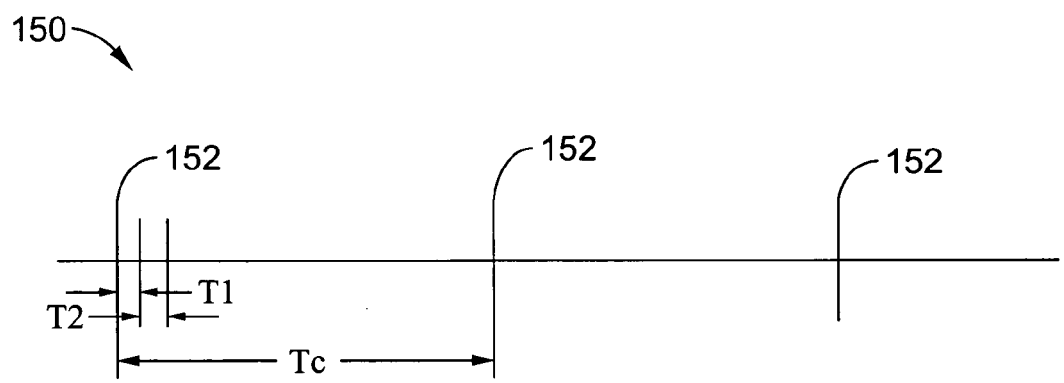
FIG. 6 is a timing diagram for network transmissions according to an aspect of the present invention, showing arbitration periods for initial time slots within the transmission cycle $T_c$.

FIG. 6 illustrates arbitration that arises when devices attempt to obtain time slots within PLC network transmissions 150. Server-1 16 obtains the fixed length time slots for sending a stream. A transmitter may obtain one or more consecutive time slots depending on the bandwidth and priority of the data. To obtain a time slot, server-1 16 joins the time slot arbitration process. Arbitration preferably occurs at a fixed time relative to each cycle, such as the time period which starts at T1 after cycle start signal 152 and lasts a period T2. Server 16 sends a slot request signal during this arbitration period. If server-1 16 wins the arbitration, it starts transmission following cycle time signal 152. If not, server-1 16 allows the winner to commence transmitting and will subsequently attempt to obtain another time slot.

Figure 7:
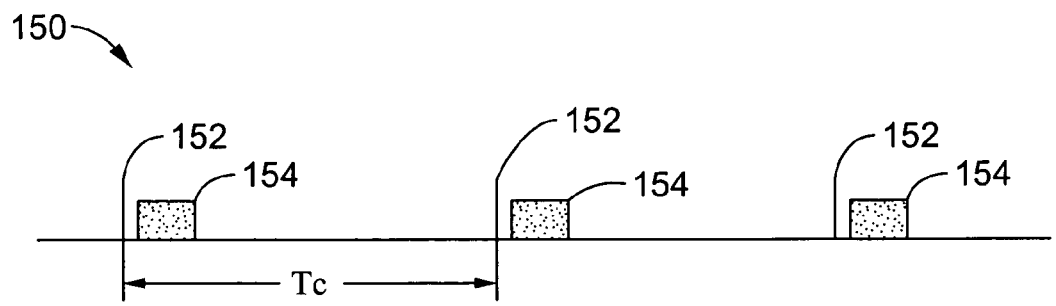
FIG. 7 is a timing diagram for network transmissions according to an aspect of the present invention, showing a first server transmitting a stream over time slots obtained from arbitration.

FIG. 7 illustrates a transmission situation in which server-1 16 won the time slot, or slots, which were available just after cycle start signal 152. Block 154 represents the time slot obtained for this cycle and for subsequent cycles. Once obtained, no other device can interrupt the time slots. Using these periodic time slots, server-1 16 transmits a stream. It should be noted that a time gap exists between cycle start signal 152 and time slot 154. This gap is preferably of a finite duration placed to beneficially absorb transmission delay. For the sake of clarity, however, the figures exaggerate the sizes of the time slot and time gap relative to the period $T_c$. It should be appreciated that each cycle $T_c$ may be divided to hundreds of time slots. The time slot length and time gap length are preferably of fixed durations, allowing a device to readily detect whether slots are occupied or not.

2.3 Second Stream.

Figure 8:
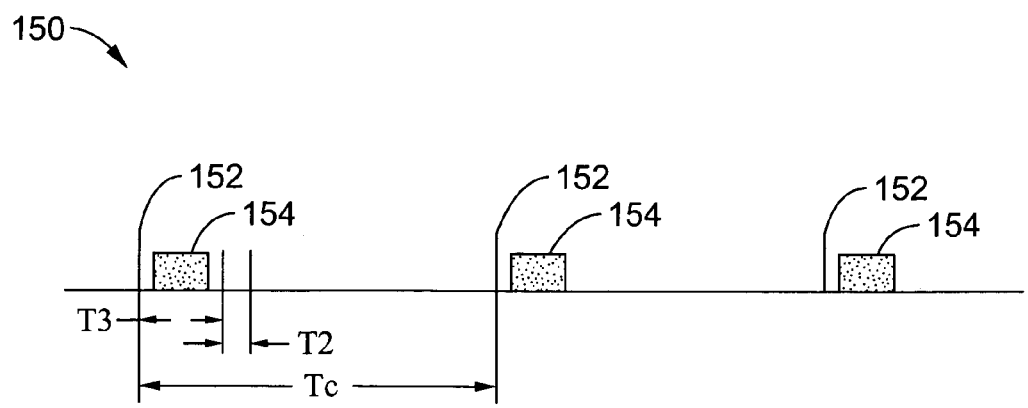
FIGS. 8–9 are timing diagrams for network transmissions according to an aspect of the present invention, showing new transmission streams being started after commencing transmission for the stream depicted in FIG. 7.
Figure 9:
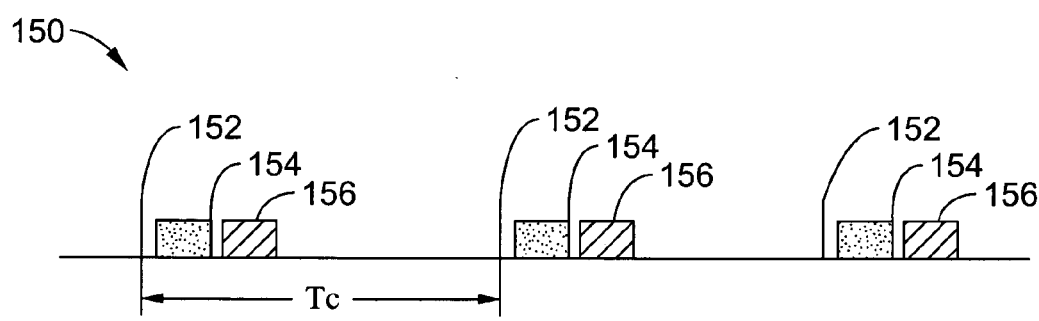

FIG. 8 and FIG. 9 depict the starting of other transmissions over the PLC network. In this case server-2 18 starts another isochronous transmission to client-2 22. Server-2 18 detects and synchronizes with the cycle start signal 152 as shown in FIG. 8. As it monitors the PLC network, server-2 18 detects that time slot 154 is already in use, whereby it will attempt to obtain the time slot which follows time slot 154. A new arbitration period starts at T3 after cycle start signal 152, whose length is preferably the same as the other arbitration period T2. The time period T3 is readily obtained from the sum of the length of time slot 154 plus time gaps. Small time gaps are preferably formed between the cycle start signal and the first time slot, or between time slots in order to absorb transmission delay on the power line.

Server-2 18 transmits a request signal during the arbitration period T2. If server-2 18 wins the time slot, the new time slot follows time slot 154. FIG. 9 depicts the time slot block 156 that was won in this case by server-2 18. Server-2 18 sends the new stream to client-2 22 using this newly obtained time slot.

It will be appreciated that the internal clock of each device on the network is slightly different from others devices, although the differences should typically be in the parts per million range, in view of the crystal controlled nature and high operating frequencies involved. The accumulation of clock difference errors is a problem in many conventional digital transmission systems. This problem, however, does not arise in the present system because each device measures a time span from the cycle time start signal generated by the cycle start master, wherein clock error is not cumulative.

2.4 Scattered Time Slots.

Figure 10:
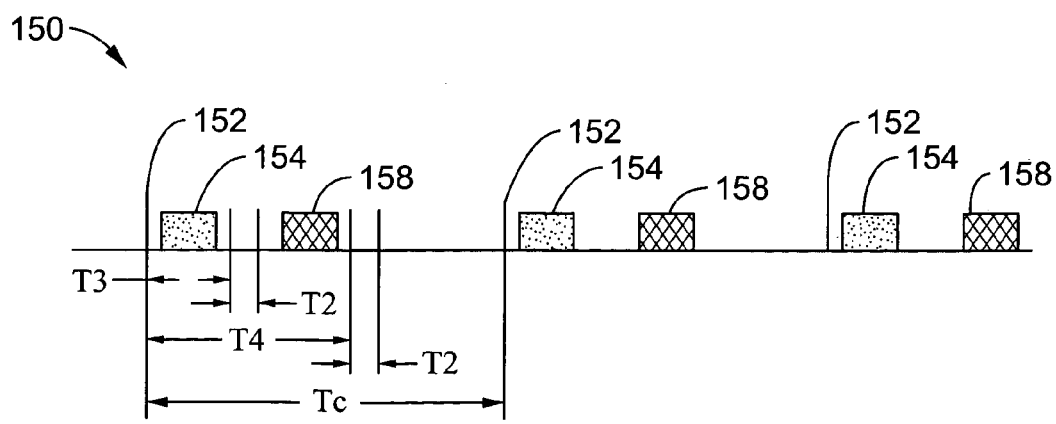
FIG. 10 is a timing diagram for network transmissions according to an aspect of the present invention, showing availability of time slots in response to a stream termination.

FIG. 10 illustrates an example of time slot availability in response to the termination of some time slots. It should be appreciated that a device can obtain any available time slot if it wins the arbitration process for that time slot.

For example if a transmitter is attempting to obtain a slot, or slots, which follow time slot 154, it transmits a request during arbitration period T2 after period T3 from cycle start 152. If the transmitter wants to obtain the slot(s) after time slot 158, it sends a request during period T2 after period T4 from the cycle start 152. When the transmitter requires several consecutive slots to send a high bit-rate stream, the transmitter monitors PLC network transmissions and selects a series of available slots. This mechanism encourages use of consecutive slots for single high-bit rate streams, and discourages scattering those slots assigned to a stream across the time axis. If the network is busy, however, a transmitter can obtain scattered slots. The present invention preferably allows choosing how the tradeoff is executed between wanting to transmit data immediately versus the desire to use consecutive time-slots.

2.5 Asynchronous Transmission Period.

When the PLC network has numerous unused time slots, asynchronous transmissions can be performed as synchronous transmissions described in the previous sections. One difference being that an asynchronous transmission can utilize the same time slot(s) for a maximum of n consecutive cycles when all available asynchronous time slots are in use. If extra time slots are available then the asynchronous transmission may continue to utilize the slots beyond the n consecutive slots.

If slots are not available, then after n cycles, the asynchronous transmitter must release the time slot(s) for use by other transmissions having a higher priority. If no such transmissions are awaiting PLC access, the transmitter could obtain the same time slots again. The value for the maximum number of consecutive cycles n may be selected in response to priority of the asynchronous transmission. For example, n may comprise a small value for a low-prioritized transmission and a larger value for a more highly prioritized transmission.

When all time slots are occupied by isochronous transmissions, an asynchronous transmission could be required to wait for an extended period of time to obtain an available time slot. To avoid possibly harmful situation, it is preferred that a portion of every cycle be assigned for use by asynchronous transmissions, wherein tasks relying on asynchronous transmission will not starve for lack of data.

Figure 11:
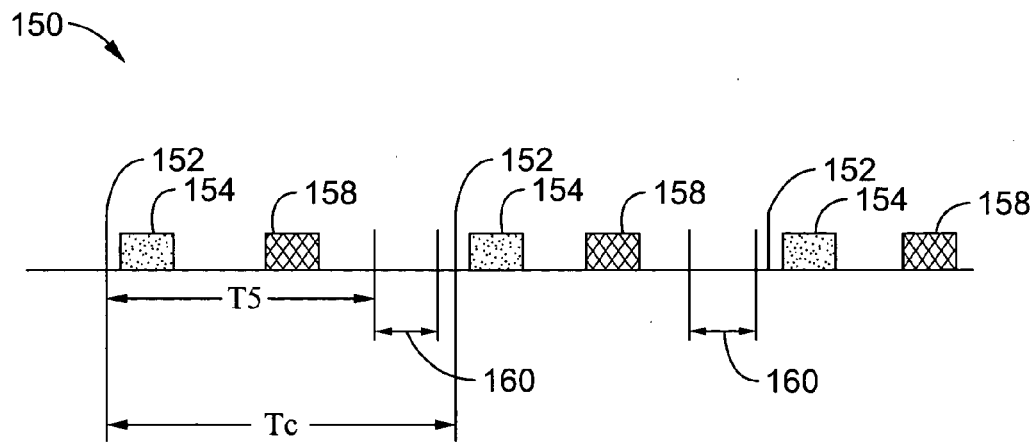
FIG. 11 is a timing diagram for network transmissions according to an aspect of the present invention, showing a portion of each cycle being reserved for asynchronous communication.

FIG. 11 illustrates by way of example the use of time period 160 as an asynchronous transmission period. This period commences at a time TS after cycle start signal 152 and terminates just prior to the start of the next cycle start signal. During asynchronous transmission period 160, an asynchronous transmitter will preferably obtain a time slot in generally the same manner as an isochronous transmission. As an alternative to this mechanism, a transmitter may obtain time slot access rights within period 160 according to a conventional CSMA/CA basis.

The asynchronous transmission period is beneficial for many applications as it guarantees backward compatibility for legacy PLC devices that only provide CSMA/CA capability, or similar. It will be appreciated that current and prior PLC devices (legacy devices) provided no ability for arbitration or isochronous transmission. Therefore, the present system can allow these devices to perform an asynchronous transmission only during the period reserved for asynchronous activity.

2.6 Arbitration.

This section explains how arbitration is performed within the present invention. It will be assumed by way of example that all transmissions are prioritized to one of three priority levels.

Priority 1 (highest): example: VoIP (isochronous)

Priority 2 (middle): example: Audio/Video transmission (isochronous)

Priority 3 (lowest): example: Data transfer, web access, etc. (asynchronous)

It should be understood that voice-over-IP (VoIP) is a highly latency-sensitive application, wherein it is given top priority for this example. The second priority is given to an audio/video stream. Data transfer (file copy, web access, and so forth) is accorded the lowest priority. During arbitration for a time slot(s), transmissions having higher priority win out over transmissions of lower priority.

Figure 12:
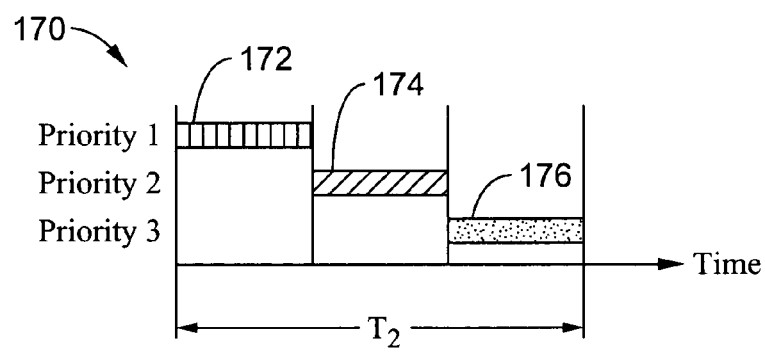
FIG. 12 is a timing diagram of the arbitration time period within network transmissions according to an aspect of the present invention, showing the relative timing of requests for time slots as a function of stream priority.

FIG. 12 illustrates time slot request timing 170. As described above, a transmitter that wants to win the time slots sends a request signal during the arbitration period, the timing of which depends on the priority of the stream to be sent. For the highest priority stream, the transmitter sends the request at the beginning portion 172 of the arbitration period T2. If the stream has the next level of priority, the request should be sent after the highest priority request, and so forth. Finally, the lowest priority request is sent during the last portion of arbitration period T2. It should be appreciated that although three time portions are described to support three priorities, any number of priorities may be supported following the teachings of the present invention.

During arbitration, when the transmitter wants to send a stream of the second highest priority, it monitors the arbitration period from the beginning. If a first priority request is detected the transmitter does not pursue this slot, or slots. In the same way, if a transmitter desires to send a low priority stream and it detects a high-level or mid-level priority request the transmitter gives up on trying to obtain the slot, thereby deferring to the higher priority transmissions.

Arbitration requests are preferably sent multiple times, such as spanning three consecutive cycles (or other predetermined or selective interval). During the arbitration period, if no higher priority request is detected for a slot, the transmitter wins the slot(s). In order to assure that higher priority requests win the arbitration, it is preferable that different arbitration monitoring lengths be utilized in response to transmission priority. Following are examples of monitoring periods based on priority for the case being described.

Priority 1: 3 cycles
Priority 2: 5 cycles
Priority 3: 7 cycles

If the transmitter sends the highest priority request in three consecutive cycles and no higher request is detected, then the transmitter may commence utilizing the time slot(s) for the transmission. Similarly, if the transmitter sends a low priority request during seven consecutive cycles and detects no higher priority requests, then the transmitter may commence transmissions.

If, however, two or more transmitters send requests with the same priority, then a collision will arise. If the transmitter detects a collision, it backs off from requesting the channel, such as entering a random back-off mode. In random back-off mode, after a randomized waiting time the transmitter again sends a time slot(s) request.

2.7 Time Slot Information Exchange.

It will be appreciated that in response to certain PLC network conditions it is possible that severe signal attenuation on the network prevents one or more devices from detecting a time slot that is already being utilized. For example, a transmitter may detect that a time slot "appears" to be is unused, but a remote receiver may detect that the same time slot is actually in use. In order to avoid this trouble, a double-check is preferably performed, wherein after winning an available time slot, the transmitter queries the receiver on whether the time slot appears to be available from the viewpoint of the receiver. If the time slot appears available from both ends, the transmitter commences transmission. If the time slot does not appear available from the receiver side, then the transmitter gives up the time slot and monitors for another available time slot, so as to avoid a time slot conflict.

Another advantage of this mechanism is that each node can make efficient use of locally available time slots in response to attenuation over an extended length, or otherwise lossy, PLC network. In this way local traffic can transmit traffic over time slots which are also being employed on a remote portion of the network. The end-to-end check on utilization prevents collisions while also opening the door for simultaneously using time slots upon which traffic is being routed in another portion of the network which is separated by sufficient attenuation to prevent excessive data errors.

As an example of this time slot "reuse", consider the case in which server-1 16 and client-1 20 are located in close physical proximity on PLC network 14. Also, consider server-2 18 and client-2 22 to be close to one another in another part of the network that is not close to server-1 16 and client-1 20, such as in opposing portions of a home, or more preferably in different homes sharing the same power distribution transformer without a blocking filter, or at least without a blocking filter that is fully effective at eliminating signal bleed-through between homes. In this case it is assumed, therefore that significant attenuation exists between the first and second client-server pairs. Under these conditions, it will be appreciated that the two pairs can simultaneously utilize the same slot, or overlapping time slots, with relative impunity from adverse transmission collisions.

AFE 84 in server-1 16 may include adaptive transmission power control capability if desired. When a client is close and signal attenuation between them is not large, server-1 16 reduces transmission power. When a client is far or the signal condition is not good and there is large attenuation, server-1 16 gains transmission power. This mechanism is originally for power consumption and electronic magnetic interference. However, it will also facilitate using the same slot at a distant place.

2.8 Cycle Start Recovery.

Consider the case in which server-1 16 is the device generating the cycle start signals 152 for the PLC network, while the other devices are synchronizing their operations with this cycle start signal. Upon server-1 16 being disconnected, the cycle start signals will be discontinued.

The present invention accommodates use on a dynamic network, because once the cycle start signal is lost, another device will take over as the cycle master and immediately begin sending new cycle start signals, preferably generally following the timing of the original cycle master. One mode of the invention allows the cycle master to determine in advance the order of its successor in response to a cycle master disconnection.

Note that each device runs for a while without the cycle start signals because the internal clock is locked to the original cycle timing. In a long run, a clock error will be accumulated and out of lock. Before being out of lock, another device will start sending cycle start signals.

The invention prevents two or more devices from both becoming the cycle master. One mechanism for preventing multiple masters is through the use of a back-off mechanism, wherein upon encountering contention, the prospective cycle masters backoff an arbitrary time delay, wherein the first to return as cycle master becomes the cycle master (regardless of whether one, two, or more back-off cycles are required to separate the field down to a single master). It will be appreciated that all devices preferably operate with their own timing cycle until the start signal is recovered, wherein interruption of the existing transmissions may be prevented.

2.9 Time Slot Reassignment for a New Stream.

To provide a more robust transmission, or a higher quality of transmission (i.e. picture transmission), an audio/video stream may utilize more time slots than minimally required, if sufficient bandwidth is available. It will be appreciated that no inherent transmission advantage accrues from leaving time slots unused. Consider the simple example of duplicative sending wherein one or more streams are duplicated on unused time slots, whereby the integrity of the data is increased. Likewise, additional time slots may be utilized in any convenient manner for increasing quality, integrity or security for one or more streams being transmitted. Another example is in case of a variable rate stream, wherein higher quality images are provided when transmitted at higher transmission rates. As many such techniques are known in the art, further details on these approaches are not necessary. Thereby one mode of the invention allows streams to utilize all the available time slots, except those set aside for asynchronous data, for improving quality, integrity or security.

When all the time slots are being utilized and a new stream is to be sent, time slot reassignment may need to be performed. By way of example, the transmitter of the new stream can first send a request within the asynchronous transmission period which asks the other devices to release time slots, wherein each transmitter receiving the request could release some of the time slots it is using. The transmitter of the new stream monitors the PLC network and checks these newly available time slots. If sufficient time slots become available, the transmitter obtains the time slots and transmits the stream. However, if insufficient time slots are made available, the transmitter sends another request.

It will be appreciated that these time slot requests may include priority information wherein streams of lower or equal priority are compelled to release a higher percentage of time slots than are released by higher priority streams. Also, the release of slots can be made contingent upon the incremental advantage made of those time slots by the stream. In either case time slots are released by the transmitting devices, after one or more rounds of requests, thereby fulfilling the needs of the new transmitter, at least insofar as the relative priority of the new stream dictates.

Figure 13:
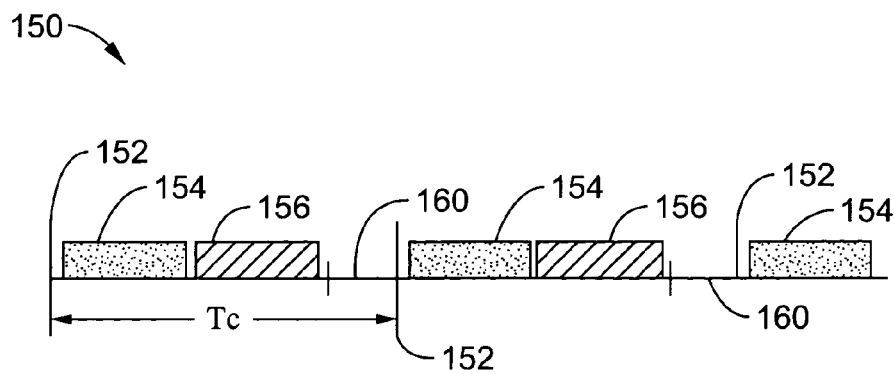
FIGS. 13–15 are timing diagrams for network transmissions according to an aspect of the present invention, showing time slot reductions by stream transmitters to allow a new stream to be transmitted.
Figure 14:
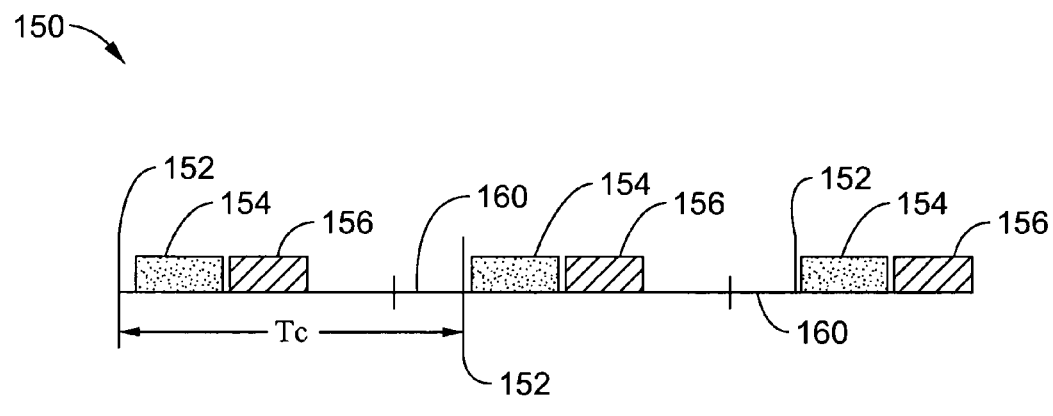
Figure 15:
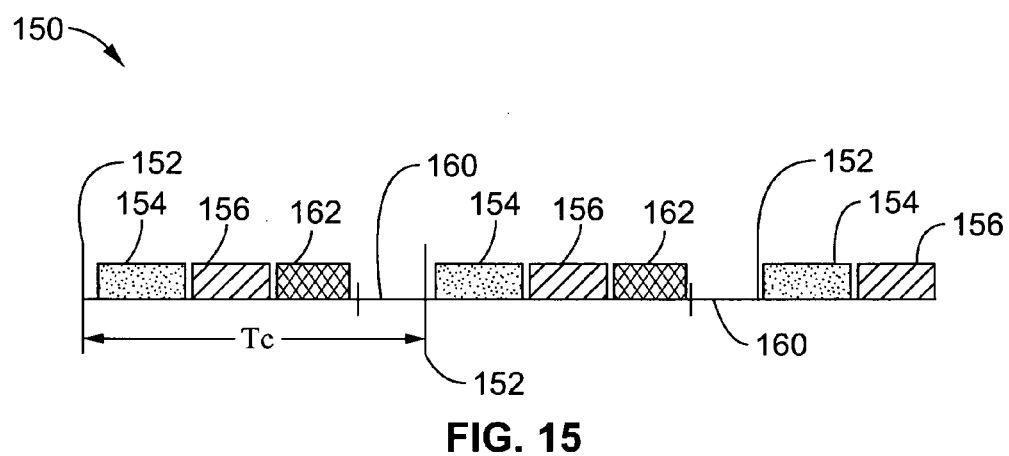

FIG. 13, FIG. 14 and FIG. 15 illustrate an example sequence of starting a new stream after first requesting that existing streams reduce time slot use, and then obtaining sufficient time slots for the new stream.

In FIG. 13 two isochronous streams 154, 156 are depicted occupying the available time slots (shown as two blocks of sequential time slots), except of course for the asynchronous transmission period 160. Consider the situation in which the transmitter desires to send a new isochronous stream. First, the new transmitter may send a time slot reassignment request to the existing transmitter(s). This request may be broadcast. The new transmitter does not have to know which devices are the existing transmitters. The existing transmitters receive the request and reduce their time slot utilization, and if required alter the encoding rate to fit the reduced bandwidth.

FIG. 14 illustrates additional time slots being opened up as a consequence of the time slot reassignment in response to the request from the new transmitter.

FIG. 15 illustrates the example of the new transmitter winning arbitration for the newly available time slots and beginning to send a new stream 162, typically comprising multiple sequential time slots. In the situation in which the new stream is from the same transmitter as the existing stream(s), the reassignment request is preferably internally handled regarding the existing stream(s) the transmitter is sending.

3. Isochronous Dummy Transmission.

It should be recognized that legacy PLC network devices are typically limited to only CSMA/CA capability. Therefore, the possibility exists that they may start a transmission at any time. The present invention allows an asynchronous transmitter, such as on a legacy device, to first check the asynchronous transmission period 160. If a time slot is available in transmission period 160, the transmitter utilizes those slots. At first, the period TS is preferably guarded from asynchronous access.

Figure 16:
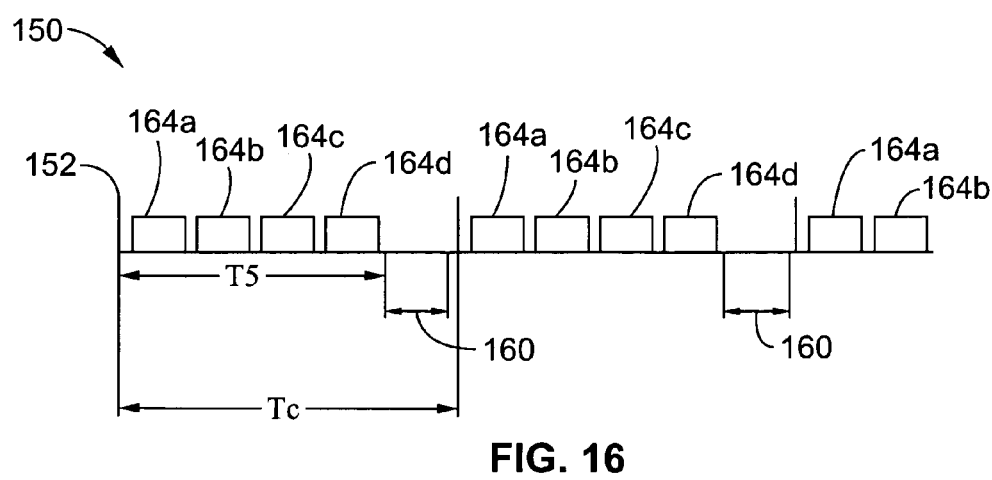
FIG. 16 is a timing diagram for network transmissions according to an aspect of the present invention, showing dummy transmissions inserted by the cycle master to reserve time slots for isochronous use.

FIG. 16 illustrates an example of protecting isochronous streams from being interrupted by legacy asynchronous streams. In this illustration dummy data is shown being generated for time slots 164a-164d, while leaving the asynchronous transmission period 160 available to legacy devices. To provide protection for the unused time slots, aside from those within asynchronous transmission period 160, the cycle master transmits dummy data in all unused slots in period TS, thereby preventing initial use by legacy devices. The combination of actual data slots and dummy data slots span the period T5, thereby preventing asynchronous access starts within T5. It will be appreciated that the figure has been simplified to show only four possible slots although hundreds of slots may be provided within the cycle period $T_c$. The priority of dummy transmissions is lower than that of any other isochronous transmission, thereby allowing an isochronous transmitter to immediately snatch dummy slots and start new isochronous streams.

Figure 17:
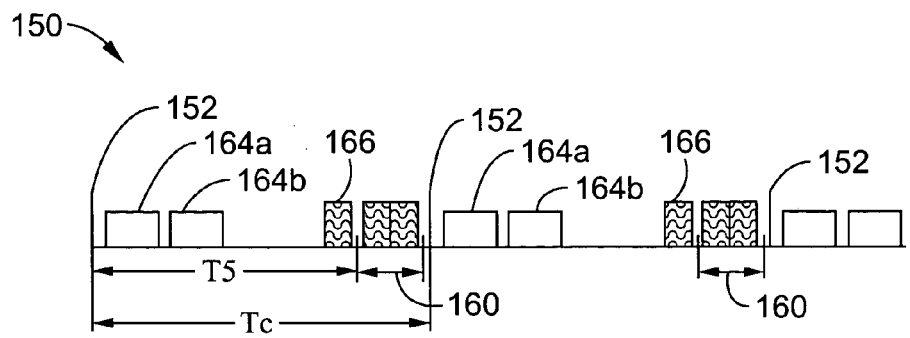
FIG. 17 is a timing diagram for network transmissions according to an aspect of the present invention, showing the cycle master releasing dummy slots for use by asynchronous communications when no more time slots are available within the reserved asynchronous period within each cycle, but are available within the isochronous portion of the cycle.

FIG. 17 illustrates compliance by the cycle master to provide time slots to asynchronous transmitters when slots are not available in asynchronous transmission period 160. If the asynchronous transmission area 160 is fully occupied, the cycle master releases at least a part of the dummy slots for use by new asynchronous transmission. The figure shows dummy transmissions 164c, 164d being dropped, wherein the new asynchronous transmitter has commenced utilizing time slot 166, which may be part of a new stream or associated with the data being sent in period 160. This mechanism guarantees efficient operation when the bulk of the requested traffic consists of asynchronous accesses. Note that the cycle number given to the asynchronous transmission is limited. After the cycle ends, an isochronous transmission may utilize the same time slot if another time slot is not available 4. Virtual Network Based Arbitration.

In the residential market for PLC networks, it is typical that several residences will share one distribution transformer, and thereby multiple virtual networks are forced to operate over a single physical PLC network (exceptions to this arise when an effective blocking filter is utilized). To prevent communications from being monitored, or otherwise utilized by other virtual networks on a single physical network, it is highly preferred that all communications over the network be encrypted, such as with common key encryption wherein only devices in a single household share the common key.

Using common-key encryption, or similar encryption techniques, neighbors are unable to decrypt transmission data without the key, and each home establishes it own VPN (Virtual Private Network). Problems arise under this multiple overlapping network environment, because no network master exists to control traffic and utilization of the shared bandwidth. Since access through the network is performed on a first-come first-serve, one household may occupy the majority, if not all, of the power-line bandwidth. Unfairness arises when devices in neighboring homes are unable to take back a portion of the network, such as what would constitute an equitable share of the bandwidth.

A server gives an incremental active stream number to each stream of a given priority level. A server transmitting three streams would embed numbers 0, 1, 2 within these streams, preferably according to priority if such a subpriority exists. It should be appreciated that any method of marking the streams may be utilized, such as numbering, text, changing the relationship between elements in the streams and so forth. By way of example and not limitation, the server marks a "0" on this first stream sent, a "1" with the second stream sent, and a "2" on the third stream sent and so forth. The first stream sent would typically be a top priority stream.

When two streams having the same priority compete for a time slot, the stream with a smaller number wins the slot. The two streams are generated from different transmitters, preferably within different virtual networks. This subpriority competitive mechanism equalizes the ability of servers to gain slots on the PLC network. On a busy network, this may translate to having the first stream that the server transmits winning a slot while the second or third streams are less likely to obtain slots. This mechanism prevents one server from transmitting numerous streams and partially or fully monopolizing the power-line bandwidth.

The active stream numbers are renewed at every stream termination, allowing the server to properly compete on the remaining transmissions. For example, upon termination of the highest priority stream, stream "0", within a given priority level (i.e. range of priorities between isochronous to asynchronous), the other streams are renumbered to best use the newly available "0" subpriority. As a result, when the first stream terminates, the second and the third stream are marked with active stream numbers "0" and "1" respectively.

Alternatively, instead of renumbering, a new number may be given to a new stream based on the total number of the active streams. Because subpriority starts with "0", the number that is 1 smaller than the total stream number is given to a new stream. For example, three streams are active and each is given 0, 1 and 2 respectively. After the first stream with number "0" terminates, a new stream will get subpriority "2". There is no problem that two or more streams share the same subpriority because subpriority is used to gain a time slot.

It should be understood that two or more servers may be connected within a given virtual network. In the case of multiple servers on virtual network, the active stream numbers can be shared within a given virtual network, so that servers within the network cooperate instead of competing. For example the programming of the servers is configured to allow the servers in the same virtual network to exchange the active stream table, and to cooperatively elect the ordering of streams and mark new streams with new active stream numbers.

5. Redundant Transmission.

As described above, when time slots are available, a transmitter may utilize extra time slots, over and above those required to contain the stream, therein making effective use of otherwise wasted bandwidth. Through the use of additional time slots, the transmitter can raise the audio/video encoding rate to provide higher quality video display and/or audio output. Moreover, transmissions may employ more robust modulation techniques, such as switching from 64-QAM (Quadrature Amplitude Modulation) to 16-QAM or QPSK (Quadrature Phase Shift Keying). It will be appreciated that adopting more robust modulation techniques decreases vulnerability to electrical and radio frequency noise sources. As mentioned previously, the transmitter may duplicate all or portions of stream data (i.e. redundant sending of streams if double the time slots are available), incorporate error correction, or more robust error correction in making use of the additional time slots.

Figure 18:
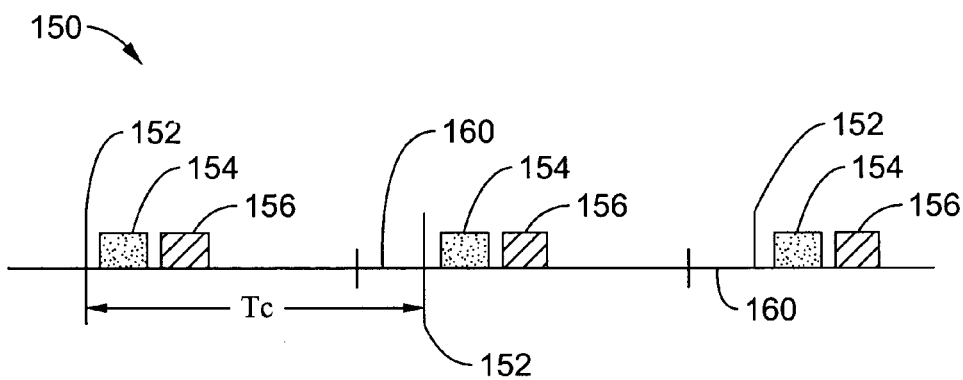
FIGS. 18–19 are timing diagrams for network transmissions according to an aspect of the present invention, showing a first and second stream obtaining additional time slots for increasing the quality, integrity, or security of the stream transmissions.
Figure 19:
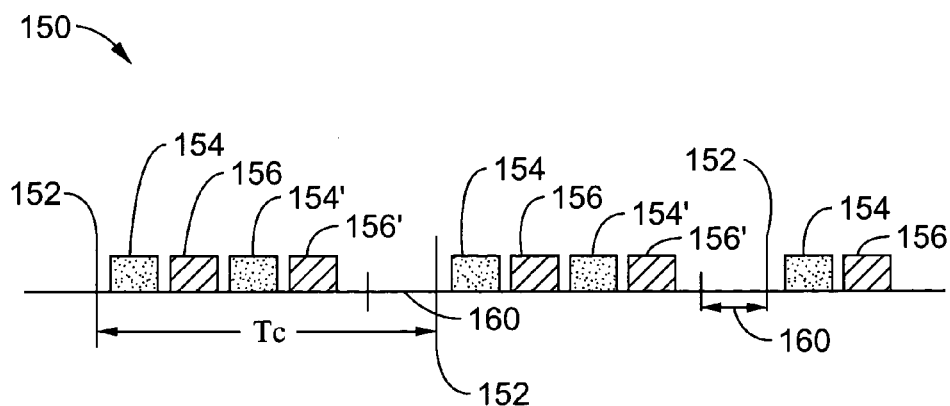

FIG. 18 and FIG. 19 illustrate gaining of extra time slots for stream transmissions. In FIG. 18 time slot 154 is assigned to the first stream and time slot 156 is assigned to the second stream. This example, and other examples within this specification, describe the use of single time slots for the sake of simplicity and clarity, however, it should be appreciated that in practice up to many hundreds of time slots may be available and a number of slots may be taken up for a given stream depending on the data rate for the stream. Furthermore, although time slots are described, other forms of slotting may be alternatively utilized such as frequency-based slotting and so forth.

Considering the case of FIG. 18, it will be noted that a large portion of the bandwidth is unused, as depicted by the portion of the cycle $T_c$ within which no stream data is being sent. In this situation the available slots can be utilized by the transmitter of each stream. The present invention is configured to prevent one stream from taking an unfair portion of the available slots, one mechanism for accomplishing this in to allow each stream to obtain unused slots one by one, such as within certain time intervals, such as allowing one slot per 300 msec to be obtained per transmitter. This mechanism fairly provides each stream with an opportunity to obtain time slots. Priority for acquiring these extra time slots is lower than for all isochronous transmission streams, wherein these requests inherently yield to time slot acquisition by new streams.

FIG. 19 illustrates an example of the process for acquiring extra time slots. The transmitter transmitting on time slot 154 obtains time slot 154', and the transmitter associated with time slot 156 obtains extra time slot 156'.

An aspect of the invention for transmitting dummy data to reserve isochronous slots was described as a mechanism to prevent asynchronous access to the isochronous area. It should be appreciated that the redundant transmissions, or other use of the extra time slots, serves to reserve those slots while increasing stream transmission benefit (i.e. quality, integrity, security, or combination thereof). In this case the cycle master does not have to generate dummy transmissions, but the transmitters are required to obtain extra time slots and change stream transmission mode to make use of the extra time slots, and to relinquish these extra slots as new streams attempt to obtain time slots.

Consider the situation of a transmitter having a new stream to be sent, wherein it monitors the network and locates available time slots. If not enough time slots are found to be available, the transmitter generates an asynchronous command to all devices on the network and requests that they stop, or at least reduce, their use of extra time slots, such as utilized for redundant transmissions or otherwise utilized for increasing quality, integrity, or security. Upon receiving this request other transmitters can release all, or a portion, of their extra slots. This request may be broadcast to any device. The new transmitter does not have to know all existing transmitters.

By way of example the other transmitters can be required to drop use of all extra time slots and utilize only the original slots, at least until the new stream has obtained its needed time slots. For instance, when the extra slots are utilized for encoding the audio/video stream at a higher rate, the transmitter sets the encoder back to the original encoding rate before it releases redundant slots. Similarly, techniques utilized to improve modulation technique, or security measures are set back to the original mode and the extra slots released. It should be noted that the redundant transmissions are performed under the control of each transmitter in a non-centralized manner without the need of intervention by a master device. In this regard, it will be appreciated that this redundant transmission can be applied to a centralized network system, and is not limited to a non-centralized network.

6. Slot Reduction In Response to Busy Network Conditions.

Situations can also arise on a busy network in which no isochronous time slots are available, although transmitters have already given back any extra slots in use, such as for redundant transmissions. In this situation the present invention is configured for reducing the basic stream transmission rates to allow the transmitting a new stream.

Figure 20:
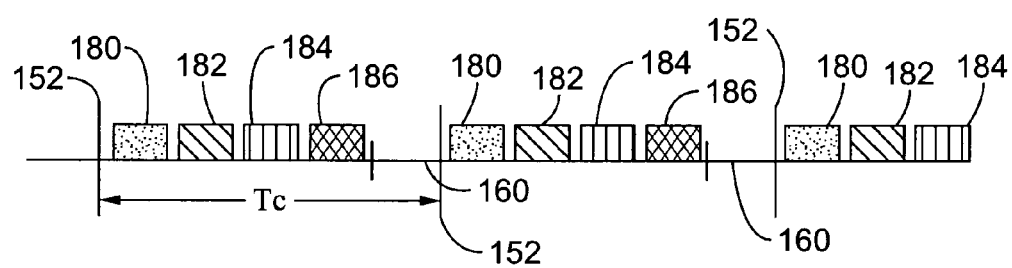
FIGS. 20–21 are timing diagrams for network transmissions according to an aspect of the present invention, showing time slot reductions being performed to allow new transmission to commence.
Figure 21:
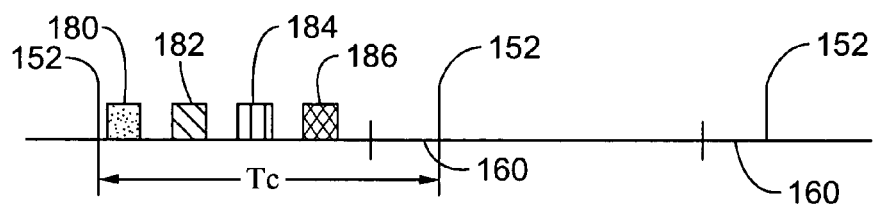

FIG. 20 and FIG. 21 illustrate an example of reducing stream bandwidth to allow other new streams to be transmitted during network stream transmissions 150. FIG. 20 depicts four streams 180, 182, 184, 186 being transmitted, with each stream having obtained a substantially equal number time slots. Also presume that $T_c$ in this example is divided into at least ten to a hundred time slots, which provides sufficiently small granularity to illustrate the ability to change the number of time slots used for a given stream transmission.

As sufficient time slots are not available, a transmitter of a new stream sends an asynchronous command to all devices asking them to reduce the number of time slots they are using. The command preferably includes one or more parameters indicative of the extent and/or priority of the request. For example the request may include a target time slot reduction target ratio, for example, 80%. Upon receiving this command each transmitter reduces the audio/video encoding rate, for example, down to 80% of the original rate by releasing some of the time slots it has obtained.

The present invention is optionally configured to provide some flexibility to the transmitters in reducing time slot use to, or toward, the target ratio, wherein transmitters having lower priority streams, or more able to lower bandwidth use are the first to relinquish time slots. The process of obtaining time slots for the new stream thereby may comprise an iterative process, until the available bandwidth is most effectively utilized. One way of thinking of this process is that the transmitter attempting to obtain time slots can start by asking "nicely" for time slots in the form of a request and if its' needs are not met it moves to, or toward, demanding that the other transmitters (in particular those of lower priority) reduce their time slot use to meet its needs.

FIG. 21 illustrates the situation after transmitters sending streams 180, 182, 182, 186 have reduced the number of time slots utilized by each of the streams. The new stream takes some or all of the released time slots. It is not necessary that the released time slots be consecutive time slots, although the present invention preferably provides one or more mechanisms for regrouping time slots within a stream to reduce fragmentation. For example by measuring time from the end of the existing time slot, instead of from the start of the cycle, time slots freed up between streams can be grouped with less fragmentation.

The new stream wins the newly released time slots and encodes its own transmission (as far as possible) at a reduction ratio which matches its request upon other channels, for example at 80%. If enough time slots cannot be obtained for the new stream, the transmitter can send another command, which may include a second target ratio, for example, 60%.

As mentioned, under certain circumstances the request or command to relinquish time slots need not be followed by every stream transmitter. By way of example, one form of communication that is time-critical and does not require a large bandwidth is that of voice over Internet-protocol (VoIP), wherein the transmitter of this stream may ignore the request or command. Reduction ratios can be based and/or modified in response to a number of factors, for instance based on stream priority. For example, a highly prioritized stream may only submit to minor rate reductions.

When an existing stream terminates and releases the associated time slots, the other streams obtain these slots, wherein the encoding rate returns to 100% (the original value). Should additional time slots become available, each stream can obtain extra slots for enhancing quality, integrity, and/or security, such as performing redundant transmissions as described above. It should be appreciated that this form of slot reduction is performed under the control of each transmitter and is not centralized because no master device exists.

7. Variations of the Present Embodiment.

An embodiment of the present invention has been described as an example implementation or implementations, it should however be recognized that aspects of the invention can be modified without departing from the teachings of the present invention. It should also be recognized that the invention can be applied generally to wireless and other networks, and its applicability need not be constrained to power-line communications.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of communicating video and/or audio streams between devices over a distributed network comprising:

generating cycle start signals over said network when cycle start signals are not detected;

wherein the period between two start cycles defines a cycle;

reserving portions of said cycle for isochronous communications;
generating dummy transmissions on unused isochronous time slots of said cycle to reserve the isochronous transmission bandwidth from use by asynchronous devices;
arbitrating for isochronous time slots, performed independently by each asynchronous transmitter, to obtain sufficient isochronous time slots for transmitting a stream; and
transmitting a stream using said isochronous time slots over said network for receipt by a recipient.

2. A method as recited in claim 1, wherein said cycle start signal is generated by a transmitter connected to said network thereby becoming the cycle master, when no other cycle master activity is detected.

3. A method as recited in claim 2, wherein upon generating a cycle start signal, if a signal collision is encountered or another signal is detected, the transmitter generating the cycle start signal halts generation of the cycle start signal and can reattempt generation only after a back-off time if no start signals generated by other transmitters are detected.

4. A method as recited in claim 3, wherein said back-off time is a random time value within given limits.

5. A method as recited in claim 1, wherein portions of said cycle are reserved for both isochronous transmissions and asynchronous communications.

6. A method as recited in claim 1, further comprising enhancing stream signals automatically by using the dummy transmission within the reserved isochronous transmission bandwidth, to communicate data for enhancing quality, integrity or security of the communication.

7. A method as recited in claim 6, wherein said cycle master generates said dummy transmissions.

8. A method as recited in claim 6, wherein said dummy transmissions are generated at the lowest priority allowing the time slots to be readily obtained for transmitting new streams.

9. A method as recited in claim 1, wherein said arbitrating comprises:
generating a time slot request in reference to the cycle start signals;
monitoring for higher priority requests for said time slot; and
obtaining said time slot for use if no higher priority requests are detected, or backing off from use and requesting a different time slot if higher priority requests are detected.

10. A method as recited in claim 1, wherein said arbitrating for bandwidth to transmit data is compatible with legacy carrier sense multiple access/collision avoidance CSMA/CA devices.

11. A method as recited in claim 1, further comprising subdividing transmission priority levels by assigning each sequential active stream a progressively lower subpriority within the given priority level.

12. A method as recited in claim 11, wherein said subpriority is utilized during arbitrating for time slots to allow requesters with higher subpriorities within a given priority level to obtain the time slot.

13. A method as recited in claim 11, wherein said subpriority levels comprise sequential numerical values.

14. A method as recited in claim 1, further comprising obtaining extra time slots by transmitting devices for increasing the quality, integrity, and/or security of a transmitted stream.

15. A method as recited in claim 1, further comprising reducing the number of time slots utilized for transmitting a stream in response to an asynchronous request from a transmitter prepared to transmit a new stream over said network.

16. A method as recited in claim 1 wherein stream transmissions emanating from devices other than the cycle master are not interrupted in response to disconnection of said cycle master.

17. A method as recited in claim 1, wherein said network comprises a power-line communications (PLC) network.

18. A method as recited in claim 17, wherein communications over said power-line communications (PLC) network are encrypted.

19. A method as recited in claim 17, wherein said cycle start signal is synchronized to the 60 Hz cycle timing of a power-line.

20. A method as recited in claim 1 further comprising having an intended receiver of a transmission check the time slot prior to transmitting a stream on said time slot.

21. A method as recited in claim 20, wherein a time slot within said transmission cycle may be obtained by multiple transmitter-receiver pairs if sufficient attenuation between each transmitter-receiver pair exists to prevent excessive data errors.

22. A method of communicating video and/or audio streams between devices over a distributed power-line network, comprising:
generating cycle start signals over said network when cycle start signals are not detected;
wherein the period between two start signals defines a cycle;
wherein said cycle start signal is generated by a transmitter connected to said network thereby becoming the cycle master, when no other cycle master activity is detected;
reserving portions of said cycle for isochronous communications in response to an arbitration process of said cycle master;
arbitrating for isochronous time slots, performed independently by each asynchronous transmitter, to obtain sufficient isochronous time slots for transmitting a stream, by
(i) generating an isochronous time slot request in reference to the cycle start signals,
(ii) monitoring for higher priority requests for said isochronous time slot,
(iii) obtaining said isochronous time slot for use if no higher priority requests are detected, or backing off from use and requesting a different isochronous time slot if higher priority isochronous time slot requests are detected;
generating dummy transmissions on any unused isochronous time slots of said cycle to reserve the isochronous transmission bandwidth from use by asynchronous devices; and
transmitting a stream using said isochronous time slots over said network for receipt by a recipient.

23. A method as recited in claim 22, wherein upon generating a cycle start signal, if a signal collision is encountered or another signal is detected, the transmitter generating the cycle start signal halts generation of the cycle start signal and can reattempt generation only after a back-off time if no start signals generated by other transmitters are detected.

24. A method as recited in claim 22. wherein portions of said cycle are reserved for both isochronous transmissions and asynchronous communications.

25. A method as recited in claim 22, further comprising subdividing transmission priority levels by assigning each sequential active stream a progressively lower subpriority within the given priority level.

26. A method as recited in claim 25, wherein said subpriority is utilized during arbitrating for time slots to allow requesters with higher subpriorities within a given priority level to obtain the time slot.

27. A method as recited in claim 25, wherein said subpriority levels comprise sequential numerical values.

28. A method as recited in claim 22, wherein communications over said power-line communications (PLC) network are encrypted.

29. A method as recited in claim 22, wherein said cycle start signal is synchronized to the 60 Hz cycle timing of a power-line.

* * * * *